United States Patent
Yang et al.

(10) Patent No.: US 8,126,096 B2
(45) Date of Patent: Feb. 28, 2012

(54) SYSTEM, APPARATUS, AND METHOD FOR MULTI-BAND OFDM SYSTEMS WITH RECEIVER ANTENNA SELECTION PER SUB-BAND

(75) Inventors: Jun Yang, Croton-on-Hudson, NY (US); Dagnachew Birru, Yorktown Heights, NY (US); Seyed-Alireza Seyedi-Esfahani, Peekskill, NY (US); Charles Razzell, Pleasenton, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 906 days.

(21) Appl. No.: 12/096,982

(22) PCT Filed: Dec. 8, 2006

(86) PCT No.: PCT/IB2006/054719
§ 371 (c)(1), (2), (4) Date: Jun. 11, 2008

(87) PCT Pub. No.: WO2007/069171
PCT Pub. Date: Jun. 21, 2007

(65) Prior Publication Data
US 2008/0299931 A1    Dec. 4, 2008

Related U.S. Application Data

(60) Provisional application No. 60/749,477, filed on Dec. 12, 2005.

(51) Int. Cl.
*H04B 7/10* (2006.01)
*H04K 3/00* (2006.01)

(52) U.S. Cl. ............ 375/347; 370/208; 455/277.2
(58) Field of Classification Search ............ 455/277.1, 455/277.2; 370/208, 334, 344; 375/347
See application file for complete search history.

(56) References Cited

U.S. PATENT DOCUMENTS

| 7,649,833 B2 * | 1/2010 | Sadri et al. ............ 370/208 |
| 2005/0075081 A1 | 4/2005 | Catreux-Erceg |
| 2005/0096001 A1 | 5/2005 | Kandala |
| 2005/0207351 A1 | 9/2005 | Inagawa |

OTHER PUBLICATIONS

I. Bahceci et al., "Performance of MIMO Antenna Selection for Space-Time Coded OFDM Systems", Proceedings of IEEE Wireless Communications and Networking Conference (WCNC 2004), vol. 2, pp. 987-992, Mar. 2004.
A. Paulraj et al., "Optimal Antenna Selection in MIMO Systems with Space-Time Block Coding", IEICE Transactions on Communications, vol. E84, No. 7, Nov. 2001.

(Continued)

*Primary Examiner* — Lee Nguyen
(74) *Attorney, Agent, or Firm* — Larry Liberchuk (57) ABSTRACT

The present invention provides a system (300-400), apparatus (300-400), and method for an energy-based antenna selection technique in which the antenna that observes the largest SNR averaged over all carriers per sub-band (405) is selected for space-time coded MB-OFDM systems. Due to the frequency-selective nature of the system, different sub-band may have different channel gaining effect from the multi-path channels. We can perform energy-based antenna selection per sub-band, and the simulation results show that the proposed technique works not only for MB-OFDM UWB channels with shadowing, but also for the same channel without shadowing.

18 Claims, 6 Drawing Sheets

OTHER PUBLICATIONS

M. Collados et al., "Performance of MIMO-OFDM WLAN Systems and Antenna Subset Selection", Philips Research laboratories, Eindhoven, The Netherlands.

S. Alamouti., A Simple Transmit Diversity Technique for Wireless Communications, IEEE J. Select Areas Communication, vol. 16, pp. 1451-1458, Oct. 1998.

A. Goret al., "Transmit/Receive MIMO Antenna Subset Selection", Proceedings of IEEE Int'l Conference on Acoustics, Speech, and Signal Processing (ICASSP 2004), pp. 13-16, vol. 2, May 2004.

X. Shao et al., "Antenna Selection for MIMO-OFDM Spatial Multiplexing System", Proceedings of IEEE International Symposium on Information Theory, pp. 90, Jun. 2003.

* cited by examiner

SYSTEM, APPARATUS, AND METHOD FOR MULTI-BAND OFDM SYSTEMS WITH RECEIVER ANTENNA SELECTION PER SUB-BAND

The present invention relates to a system, apparatus and method for receiver antenna selection per sub-band in multi-band OFDM systems that reduce the number of RF chains and the cost associated with multiple RF chains.

In next generation multi-band OFDM systems, the spatial diversity is of particular interest since it can exploit the richly scattered channel environment by using multiple transmit and receive antennas (MIMO). At the same time, spatial diversity can provide significant improvements in system performance. To improve the performance of Multi-band OFDM system while maintaining the high data rate and low decoding complexity, space-time coded OFDM system is a good option, such as Alamouti code using two transmitting antennas, see S. Alamouti, "A simple transmit diversity technique for wireless communications," IEEE J. Select. Areas Comm, vol. 16, pp. 1451-1458, October 1998. The improvement in the performance using multiple antenna techniques comes with a natural drawback of increased cost due to the necessity of multiple RF chains used for implementation.

A way to reduce this cost is needed, a way that maintains the performance improvement of multiple antenna techniques.

The system, apparatus and method of the present invention provide a technique for performing antenna selection that reduces the number of antennas selected and therefore the associated cost.

A preferred embodiment of the present invention is a simple selection criteria based on the inherent frequency and spatial diversity between different sub-bands of multi-band orthogonal frequency division multiplexing MB-OFDM systems.

Antenna selection according to the present invention retains most of the benefits of a multiple antenna system and reduces the number of antennas selected and the corresponding RF chains. The antenna selection technique can be used for frequency-selective channels in the context of space-time coded OFDM systems. Typically, such a selection criteria can be quite complicated due to the large number of sub-channels between antenna pairs.

In a preferred embodiment, the selection metric is an energy-based antenna selection technique in which the antennas are selected by observing the largest SNR averaged over all carriers in each sub-band.

Due to the frequency-selective nature of MB-OFDM systems, different sub-bands may have different shadowing effects from the multi-path channels. Using the technique of a preferred embodiment, energy-based antenna selection per sub-band is performed and simulation results confirm works not only for MB-OFDM UWB channels with shadowing, but also for the same channels without shadowing.

It is to be understood by persons of ordinary skill in the art that the following descriptions are provided for purposes of illustration and not for limitation. An artisan understands that there are many variations that lie within the spirit of the invention and the scope of the appended claims. Unnecessary detail of known functions and structure may be omitted from the current descriptions so as not to obscure the present invention.

In a preferred embodiment the MB-OFDM system utilizes two receive antennas. The preferred embodiment can be easily extended to the case of more than two receive antennas. The number of transmit antennas is greater than or equal to 1. When the number of transmit antennas is 1, a single antenna transmission is performed. When the number of transmit antennas is two, space-time coded transmission is performed (e.g., using Alamouti codes).

Figure 4:
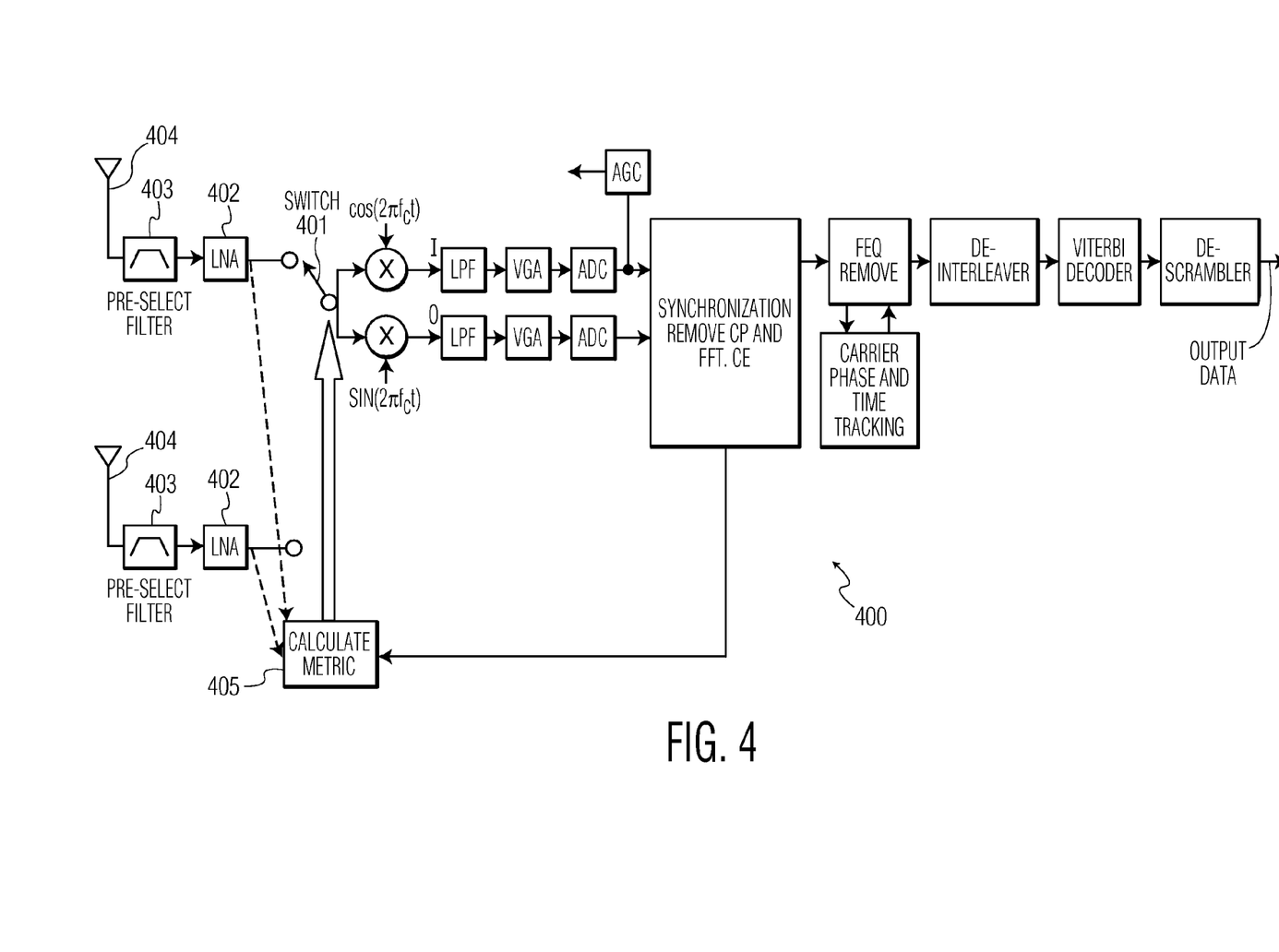
FIG. 4 illustrates a receiver architecture modified according to the present invention.

Prior art MB-OFDM UWB systems employ time frequency code (TFC) to perform frequency hopping over the band. The hopping pattern for TFC can be 1, 2, 3, 1, 2, 3, which has a period of six hops and the duration of each hop is one OFDM symbol. The advantage of antenna selection at the receiver is its low complexity, only one RF chain, one analog-to-digital converter (ADC) and one fast Fourier transform (FFT). The additional complexity of the system, apparatus, and method of the present invention is due to inclusion of a switch 401 in the front end of the receiver plus some calculation of metrics 403 used for antenna selection, see, e.g., A. Gorokhov, M. Collados, D. Gore, A. Paulraj, "Transmit/receive MIMO antenna subset selection," Proc. IEEE International Conference on Acoustics, Speech, and Signal Processing (ICASSP '04), pp. 13-16, vol. 2, May 2004; X. Shao, J. Yuan, P. Rapajic, "Antenna selection for MIMO-OFDM spatial multiplexing system," Proc. IEEE International Symposium on Information Theory, pp. 90, June 2003; and I. Bahcci, T. M. Duman, Y. Altunbasak, "Performance of MIMO antenna selection for space-time coded OFDM systems", Proc. IEEE Wireless Communications and Networking Conference (WCNC 2004), vol. 2, pp. 987-992, March 2004.

In a preferred embodiment, the sum of power of all sub-carriers per sub-band is used as the selection metric. The pre-select filter 403 at the receiver captures the signals according to the designed bandwidth, and passes the signals into the LNA 402. For one transmit antenna, the switch 401 is controlled by the metric calculation 405 and performed as:

$$\text{Switch} = \begin{cases} \text{up}, & \sum_n |h_{n,1}|^2 > \sum_n |h_{n,2}|^2 \\ \text{down}, & \sum_n |h_{n,1}|^2 < \sum_n |h_{n,2}|^2 \end{cases}$$

where $h_{n,l}$ are estimated channel coefficients on sub-carrier n and receive antenna l.

For two transmit antennas using Alamouti codes, the switch 401 is controlled by the metric calculation 405 and performed as $$\text{Switch} = \begin{cases} \text{up}, & \sum_n (|h_{n,1}^1|^2 + |h_{n,1}^2|^2) > \sum_n (|h_{n,2}^1|^2 + |h_{n,2}^2|^2) \\ \text{down}, & \sum_n (|h_{n,1}^1|^2 + |h_{n,1}^2|^2) < \sum_n (|h_{n,2}^1|^2 + |h_{n,2}^2|^2) \end{cases}$$

where $h_{n,l}^m$ are estimated channel coefficients on sub-carrier n between transmit antenna m and receive antenna l.

Figure 1A:
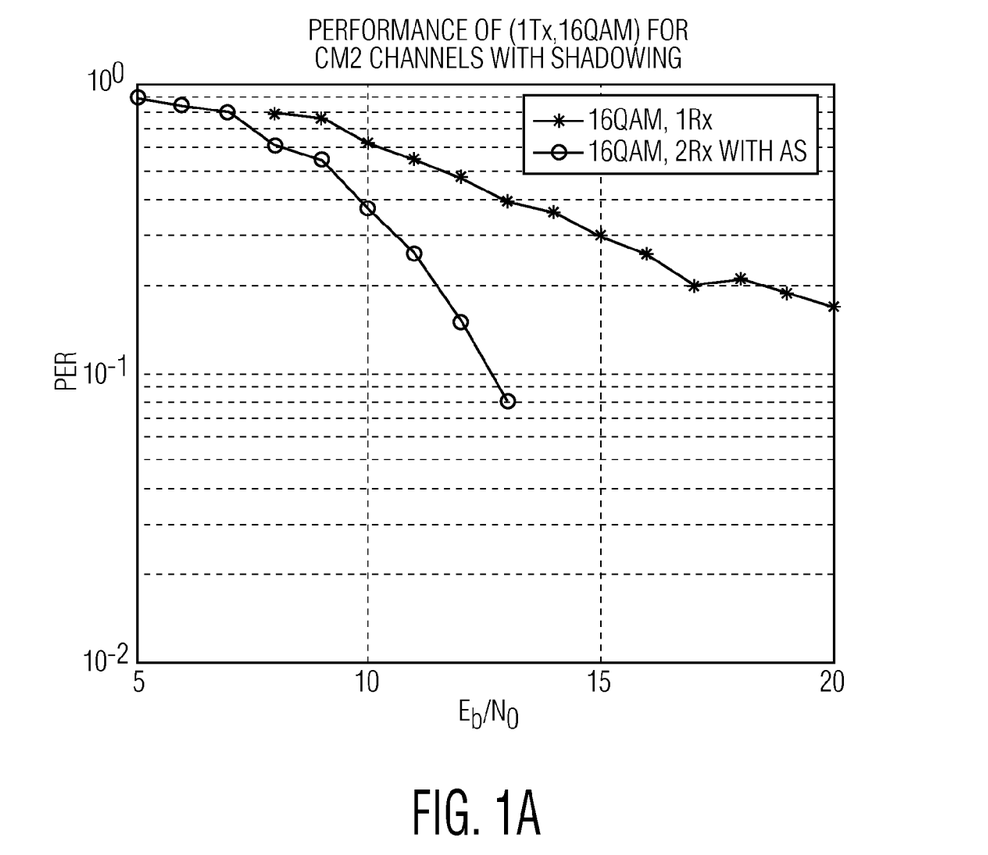
FIG. 1 illustrates PER curves of single antenna transmission and Alamouti coded two-antenna transmission for MB-OFDM UWB channels (CM2) with shadowing, with a packet size of 1 k bytes and 16QAM modulation.
Figure 1B:
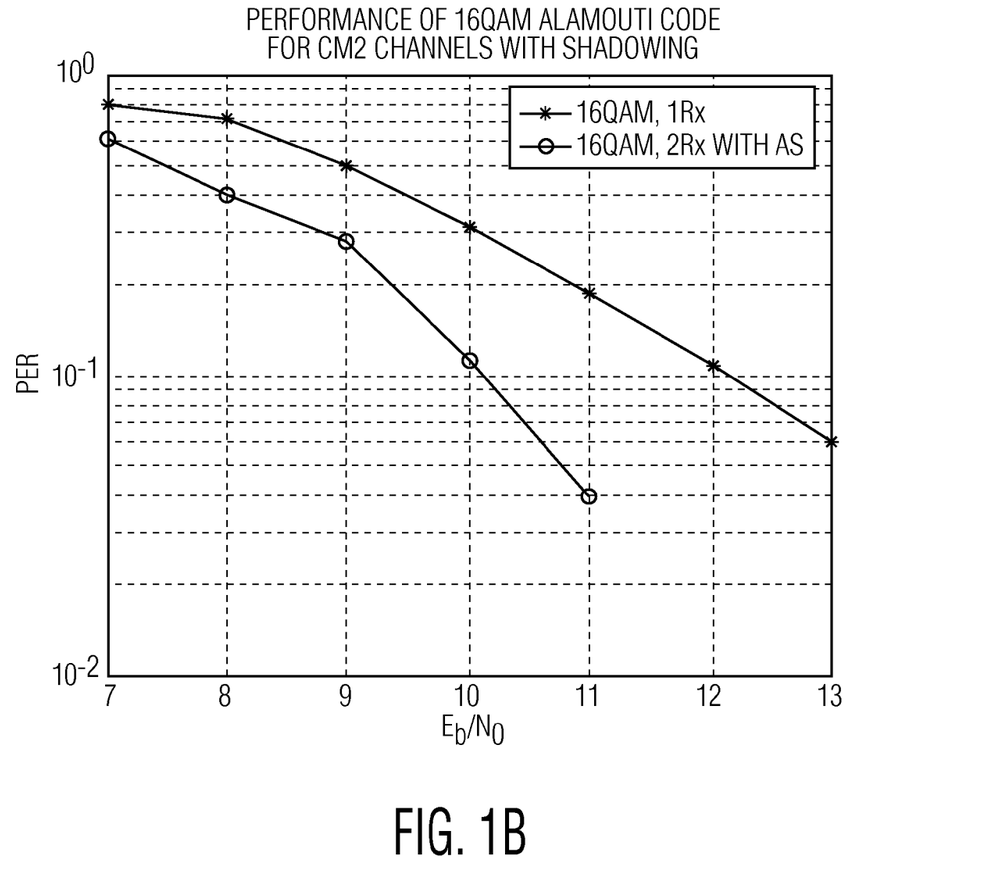

A simulation environment uses the current MB-OFDM UWB channels (CM2) with shadowing, a packet size of 1 k bytes and 16QAM modulation. The PER curves are illustrated in FIGS. 1A-B.

If channel has shadowing, it is obvious that the preferred embodiment of the present invention has certain gain due to the fact that different receive antennas have different receiving power.

Figure 2A:
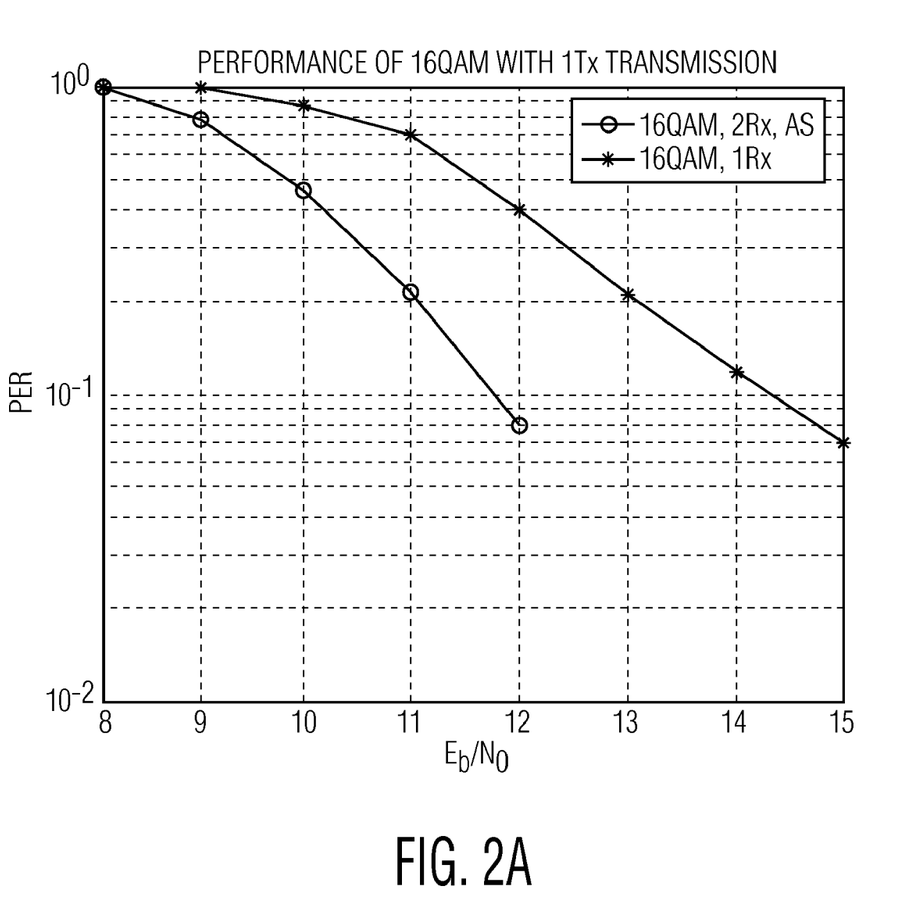
FIG. 2 illustrates PER curves of single antenna transmission and Alamouti coded two-antenna transmission for MB-OFDM UWB channels (CM2) without shadowing, with a packet size of 1 k bytes and 16QAM modulation.
Figure 2B:
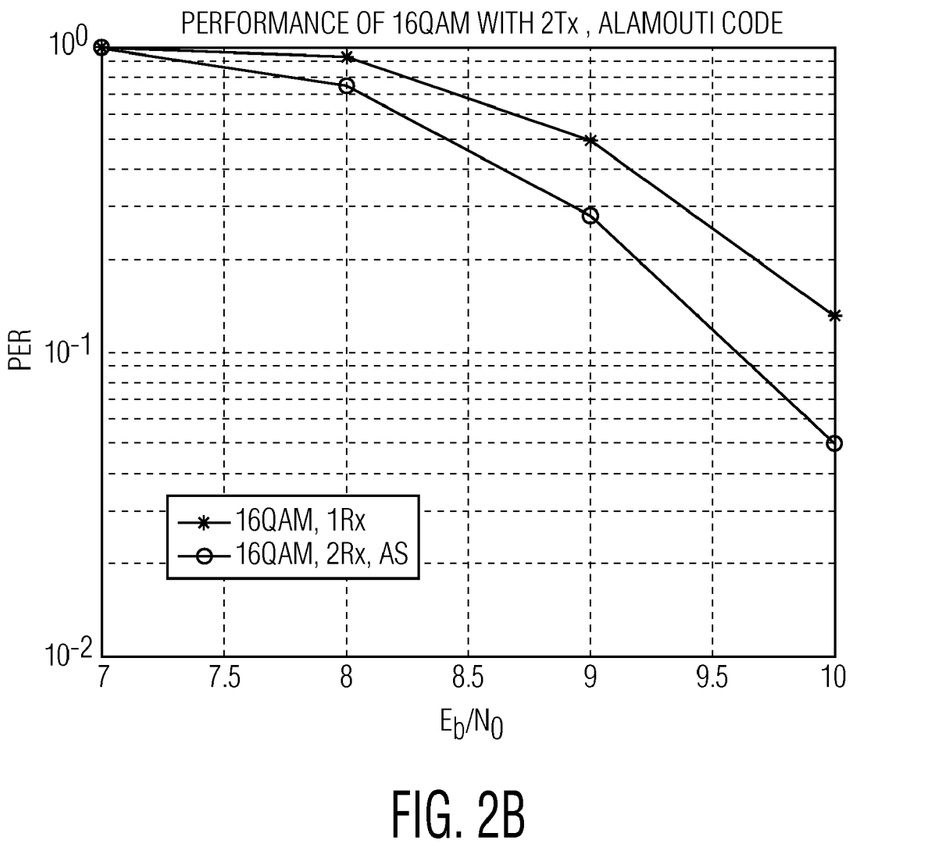

Simulation was performed for the current MB-OFDM UWB channels (CM2) without shadowing. Without the shadowing effect, the simulation results illustrated in FIG. 2 show that the system, apparatus, and method of the present invention can still exploit the power gain among three sub-bands by tracking the power of each receive antenna.

Figure 3:
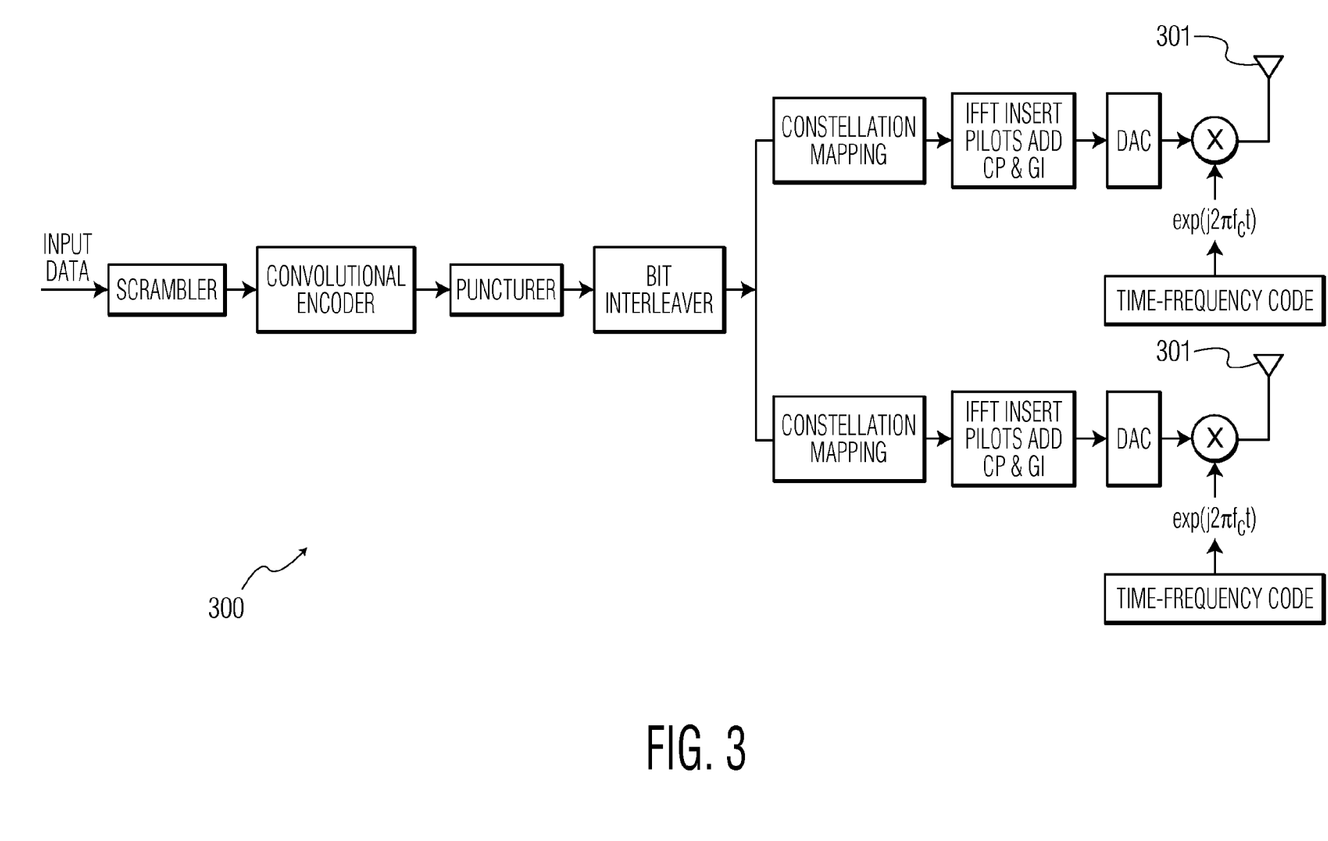
FIG. 3 illustrates a transmitter architecture with two antennas.

FIG. 3 shows the transmitter architecture 300 of a preferred embodiment with two antennas (for a one transmit antenna design, only one branch should be used in the transmitter architecture).

The receiver structure 400 of a preferred embodiment is illustrated in FIG. 4, where the switch 401 is placed after the LNA unit 402 so that the performance loss caused by the switch can be reduced. The calculation of metric (405) can be processed after channel estimation (CE) from the baseband (shown in solid arrow). It is possible but not favourable to calculate metric right after the LNA (402) from the front end (shown in dashed arrow). Placing the switch after the LNA is a preferred embodiment since it results in much less degradation of noise figure (e.g. 0.2 dB c.f. 1.5 dB in the typical art). The use of 2 LNAs to achieve this objective is a small price to pay for the significant advantage. One advantageous way to switch between the outputs of the two LNAs is to use a passive combiner instead of a switch, and to selectively power only the LNA that corresponds to the antenna to be selected. The other LNA can be either turned off entirely, or switched to a low bias mode, such that the gain is minimal compared to the fully powered LNA. This system 300-400, apparatus 300-400, and method of the present invention allows existing MB-OFDM systems to achieve more performance gain while maintaining the same transmission rate and low receiver complexity. One of the immediate applications is the next generation (Gigabit) Multi-Band OFDM UWB systems.

While the preferred embodiments of the present invention have been illustrated and described, it will be understood by those skilled in the art that the system, apparatus and methods as described herein are illustrative and various changes and modifications may be made and equivalents may be substituted for elements thereof without departing from the true scope of the present invention. In addition, many modifications may be made to adapt the teachings of the present invention to a particular situation without departing from its central scope. Therefore, it is intended that the present invention not be limited to the particular embodiments disclosed as the best mode contemplated for carrying out the present invention, but that the present invention include all embodiments falling within the scope of the claim appended hereto.

We claim:

1. A system for receive antenna selection per sub-band in multi-band orthogonal frequency division multiplexing (MB-OFDM) systems, comprising:
a transmitter operably connected to at least one transmit antenna to transmit a message and that employs a time frequency code (TFC) pattern to perform frequency hopping; and
a receiver comprising at least two receive antennas and a switch that uses a selection metric to select one antenna of the at least two receive antennas to receive a message transmitted by a transmit antenna using the TFC,
wherein, the receive antenna that observes the largest signal-to-noise ratio (SNR) averaged over all sub-carriers per sub-band is selected; and
wherein the selection metric is a function of a sum of sub-carrier powers per sub-band.

2. The system of claim 1, wherein the receiver further comprises a low noise amplifier (LNA) arranged between the pre-select filter and the switch to reduce a performance loss caused by the switch.

3. The system of claim 2, wherein the switch selects a receive antenna with a selection metric from the group consisting of capacity-based metrics, performance-based metrics, and energy-based metrics.

4. The system of claim 3, wherein the selection metric is processed at a position selected from the group consisting of after channel estimation and immediately after the LNA.

5. The system of claim 4, wherein for one transmit antenna, the selection metric for the switch is as follows $$\text{Switch} = \begin{cases} \text{up}, & \sum_n |h_{n,1}|^2 > \sum_n |h_{n,2}|^2 \\ \text{down}, & \sum_n |h_{n,1}|^2 < \sum_n |h_{n,2}|^2 \end{cases}$$

where $h_{n,l}$ are estimated channel coefficients on sub-carrier n and receive antenna l.

6. The system of claim 4, wherein for two transmit antennas and Alamouti codes, the selection metric for the switch is as follows $$\text{Switch} = \begin{cases} \text{up}, & \sum_n \left(|h_{n,1}^1|^2 + |h_{n,1}^2|^2\right) > \sum_n \left(|h_{n,2}^1|^2 + |h_{n,2}^2|^2\right) \\ \text{down}, & \sum_n \left(|h_{n,1}^1|^2 + |h_{n,1}^2|^2\right) < \sum_n \left(|h_{n,2}^1|^2 + |h_{n,2}^2|^2\right) \end{cases}$$

where $h_{n,l}^m$ are estimated channel coefficients on sub-carrier n between transmit antenna m and receive antenna l.

7. A method for selecting a receive antenna per sub-band in multi-band orthogonal frequency division multiplexing (MB-OFDM) systems, comprising the steps of:
providing at least one transmit antenna to transmit a message and that employs a time frequency code (TFC) pattern to perform frequency hopping;
transmitting a message by the at least one transmit antenna;
providing at least two receive antennas operably interfaced to a switch;
determining a selection metric as a function of a sum of sub-carrier powers per sub-band;
using the selection metric by the switch to select a receive antenna, of the provided at least two receive antennas that observes the largest signal-to-noise ratio (SNR) averaged over all sub-carriers, to receive the message transmitted by the transmit antenna; and
receiving by said selected receive antenna the message transmitted by the at least one transmit antenna.

8. The method of claim 7, further comprising the steps of:
arranging a low noise amplifier (LNA) between each of the at least two receive antennas and the switch to reduce a performance loss caused by the switch; and
determining the selection metric as a function of a sum of sub-carrier powers per sub-band at a position selected from the group consisting of after channel estimation and immediately after the LNA.

9. The method of claim 8, wherein the selection metric is selected from the group consisting of capacity-based metrics, performance-based metrics, and energy-based metrics.

10. The method of claim 8, wherein the selection metric is a function of a sum of sub-carrier powers per sub-band.

11. The method of claim 10, wherein for one transmit antenna, the selection metric for the switch is as follows $$\text{Switch} = \begin{cases} \text{up}, & \sum_n |h_{n,1}|^2 > \sum_n |h_{n,2}|^2 \\ \text{down}, & \sum_n |h_{n,1}|^2 < \sum_n |h_{n,2}|^2 \end{cases}$$

where $h_{n,l}$ are estimated channel coefficients on sub-carrier n and receive antenna l.

12. The method of claim 10, wherein for two transmit antennas and Alamouti codes, the selection metric for the switch is as follows $$\text{Switch} = \begin{cases} \text{up}, & \sum_n (|h_{n,1}^1|^2 + |h_{n,1}^2|^2) > \sum_n (|h_{n,2}^1|^2 + |h_{n,2}^2|^2) \\ \text{down}, & \sum_n (|h_{n,1}^1|^2 + |h_{n,1}^2|^2) < \sum_n (|h_{n,2}^1|^2 + |h_{n,2}^2|^2) \end{cases}$$

where $h_{n,l}^m$ are estimated channel coefficients on sub-carrier n between transmit antenna m and receive antenna l.

13. A receiver for receive antennas selection per sub-band in multi-band orthogonal frequency division multiplexing (MB-OFDM) channels, comprising:
a receiver comprising at least two receive antennas and a switch that uses a selection criterion to select an antenna of the at least two receive antennas to receive a message transmitted by a transmit antenna using time frequency code (TFC),
wherein, a receive antenna of the at least two receive antennas that observes the largest signal-to-noise ratio (SNR) averaged over all sub-carriers per sub-band is selected, and
wherein the selection criterion is a function of a sum of sub-carrier powers per sub-band.

14. The receiver of claim 13, further comprising a low noise amplifier (LNA) arranged between each of the at least two receive antennas and the switch, to reduce a performance loss caused by the switch.

15. The receiver of claim 14, wherein the switch selects one of the at least two receive antennas with a selection metric selected from the group consisting of capacity-based metrics, performance-based metrics, and energy-based metrics.

16. The receiver of claim 15, wherein the selection criterion is processed at a position selected from the group consisting of after channel estimation and immediately after the LNA.

17. The receiver of claim 16, wherein for one transmit antenna, the selection criterion for the switch is as follows $$\text{Switch} = \begin{cases} \text{up}, & \sum_n |h_{n,1}|^2 > \sum_n |h_{n,2}|^2 \\ \text{down}, & \sum_n |h_{n,1}|^2 < \sum_n |h_{n,2}|^2 \end{cases}$$

where $h_{n,l}$ are estimated channel coefficients on sub-carrier n and receive antenna l.

18. The receiver of claim 16, wherein for two transmit antennas and Alamouti codes, the selection criterion for the switch is as follows $$\text{Switch} = \begin{cases} \text{up}, & \sum_n (|h_{n,1}^1|^2 + |h_{n,1}^2|^2) > \sum_n (|h_{n,2}^1|^2 + |h_{n,2}^2|^2) \\ \text{down}, & \sum_n (|h_{n,1}^1|^2 + |h_{n,1}^2|^2) < \sum_n (|h_{n,2}^1|^2 + |h_{n,2}^2|^2) \end{cases}$$

where $h_{n,l}^m$ are estimated channel coefficients on sub-carrier n between transmit antenna m and receive antenna l.

* * * * *